United States Patent
Farah et al.

(10) Patent No.: US 9,663,648 B2
(45) Date of Patent: May 30, 2017

(54) POLYPROPYLENE FOR THE PRODUCTION OF THERMOFORMED ARTICLES, LARGE, DEEP, COMPLEX AND/OR THICK ARTICLES, PROCESS FOR THERMOFORMING MODIFIED POLYPROPYLENE INTO LARGE, DEEP, COMPLEX AND/OR THICK ARTICLES AND USE OF THE POLYPROPYLENE

(75) Inventors: Marcelo Farah, Porto Alegre RS (BR); Fernando Cruz, Sao Carlos SP (BR); Alessandro Cauduro Lima, Porto AlegreRS (BR); Alexandre di Pintor da Luz, Canoas RS (BR); Etienne Marcos de Almeida Rocha, Porto Alegre RS (BR); Ana Paula de Azeredo, Sapucaia do Sul RS (BR); Claudio Jose Autran Neves, Porto Alegre RS (BR); Fabio Lamon Sofri, Porto Alegre RS (BR)

(73) Assignee: Braskem S.A., Camacari-BA (BR)

( * ) Notice: Subject to any disclaimer, the term of this patent is extended or adjusted under 35 U.S.C. 154(b) by 30 days.

(21) Appl. No.: 14/351,027

(22) PCT Filed: Oct. 11, 2011

(86) PCT No.: PCT/BR2011/000360
§ 371 (c)(1),
(2), (4) Date: Jul. 1, 2014

(87) PCT Pub. No.: WO2013/053025
PCT Pub. Date: Apr. 18, 2013

(65) Prior Publication Data
US 2014/0308502 A1    Oct. 16, 2014

(51) Int. Cl.
| | |
|---|---|
| *C08L 23/26* | (2006.01) |
| *B29C 51/10* | (2006.01) |
| *C08L 23/10* | (2006.01) |
| *C08L 23/14* | (2006.01) |
| *B29K 23/00* | (2006.01) |
| *B29C 51/00* | (2006.01) |

(52) U.S. Cl.
CPC .............. *C08L 23/26* (2013.01); *B29C 51/10* (2013.01); *C08L 23/10* (2013.01); *C08L 23/14* (2013.01); *B29C 51/002* (2013.01); *B29C 2791/006* (2013.01); *B29K 2023/12* (2013.01); *C08L 2203/30* (2013.01); *C08L 2207/02* (2013.01); *C08L 2207/07* (2013.01)

(58) Field of Classification Search
CPC ................................ C08L 23/26; B29C 51/10
USPC ........... 526/348; 428/220; 525/240; 524/528
See application file for complete search history.

(56) References Cited

U.S. PATENT DOCUMENTS 6,632,854 B1 * 10/2003 Charlier ................ C08F 255/00
522/113

FOREIGN PATENT DOCUMENTS

WO    WO2011/086581    *    7/2011

* cited by examiner

*Primary Examiner* — Jim J Seidleck
*Assistant Examiner* — Deve E Valdez
(74) *Attorney, Agent, or Firm* — Duane Morris LLP (57) ABSTRACT

The present invention is directed to a modified polypropylene comprising from 0.3 to 2 long-chain branches per 1,000 carbon atoms, wherein said long-chain branch has more than 1,000 carbon atoms and 0 to 6% of ethene and/or alpha-olefinic comonomer having 3 to 18 carbon atoms. The polypropylene of the present invention is a homopolymer, a random copolymer, or a heterophasic copolymer. The present invention also relates to large, deep, complex and/or thick articles which are thermoformed from said polypropylene. Furthermore, the present invention relates to the process for thermoforming said modified polypropylene into large, deep, complex and/or thick articles. The present invention also relates to the use of the polypropylene to prepare large, deep, complex and/or thick articles.

14 Claims, 6 Drawing Sheets

POLYPROPYLENE FOR THE PRODUCTION OF THERMOFORMED ARTICLES, LARGE, DEEP, COMPLEX AND/OR THICK ARTICLES, PROCESS FOR THERMOFORMING MODIFIED POLYPROPYLENE INTO LARGE, DEEP, COMPLEX AND/OR THICK ARTICLES AND USE OF THE POLYPROPYLENE

FIELD OF THE INVENTION

The present invention is directed to a polypropylene, said polypropylene being a homopolymer, a random copolymer, or a heterophasic copolymer modified to be better suited to the thermoforming process of large, deep, complex and/or thick articles to be used in automotive vehicles such as in bumpers, instrument panels, seats, backrests, glove compartment doors, center consoles, door protectors, door stanchions, fluid reservoirs, tire protectors, fenders, and the like, in refrigerators and freezers such as counter doors, cases, fluid reservoirs, evaporators and the like, in other household appliances such as air conditioners, dishwashers, laundry machines, TVs, vacuum cleaners, etc, in furniture, tractors, garden tractors, trucks, buses, etc. and in electronic equipment, such as TVs, DVDs, sound systems, home-theaters, notebooks, netbooks, desktops, and the like.

STATE OF THE ART

The thermoforming process is widely known in the art to be defined by first extruding the product into sheets, these sheets being re-heated up to temperatures close to the melting temperature and, in a simplified manner, with the aid of a die, the sheets are vacuum thermoformed, which draws the molten sheet towards the die. Since vacuum holds the sheet into the die shape, heat-exchange take place and the polymer crystallizes or stiffens maintaining the die shape.

This process is widely used to manufacture utensils and articles of several sizes due to its low cost of infrastructure implementation, such as the cost of the die and the machine, as well as high throughput. For thermoforming large, deep, complex and/or thick articles, the polypropylene must have some important properties, such as having resistance to its own weight (SAG) during the heating step and a thermoforming window suitable to copy the die details completely. In this case, polymers that usually have these characteristics are HIPS (high-impact polystyrene), ABS (acrylonitrile butadiene styrene) and HDPE (high-density polyethylene). Traditional polypropylene is limited by its characteristics of not supporting its own weight when in higher thicknesses and/or the elevated heating times required for temperature homogenization in the sheet to be thermoformed. A solution for using polypropylene is to use polypropylene compounds and blends with mineral fillers and rubbers to overcome such limitation. This step, in addition to adding a manufacture cost of compounding or blending extrusion, causes the generated product to have increased density, which will cause the final application to have larger weight thus requiring more energy to be transported. Morphological stability of extrusion-generated multiphase systems is highly dependent upon the manufacture conditions and can vary in accordance with the manufacture batch. Recyclability of these blends and compounds is limited to some applications as they cannot be used for due to the presence of fillers. An example of the use of neat polypropylene is in internal articles of refrigerators. Many works have attempted to increase liner resistance (internal parts (except for shelves and drawers)) of refrigerators against chemical attacks, because of the constant deficiency of HIPS- and polystyrene-based solutions in co-extruded structures. Resistance of polystyrene structures may still suffer with the use of products to clean refrigerators, as continuous use generates micro fractures that can become cracks over time of use. The invention described herein provides a product where chemical resistance is no longer an issue to liner manufacturers, since polypropylene's behavior is very superior. The same problem is seen with the attack from expansion gases of polyurethane, which is responsible for thermal insulation of refrigerators, which gases attack polystyrene and HIPS layers. Chemical inertness of polypropylene over its surrogates provide the polypropylene with a great competitive advantage since it allows for reduction in the thickness of sheets applied to liners and has lower density.

Co-extruded layers are used with a visual appeal where the outer layer increases the brightness of the article. As polypropylene provides sheets having excellent brightness even in monolayers, the structure can be completely substituted with a solution in monolayer without losing resistance to chemical attack. In order to obtain new properties of the sheet, such as greater scratch resistance, soft-touch, among others, co-extrusion with thin layers of LLDPE (linear low density polyethylene), LDPE (low density polyethylene), HDPE and polypropylene homopolymer, among other polymers, can be used.

U.S. Pat. No. 5,286,428 discloses polypropylene sheets having compounded therein from 10 to 50% of mineral fillers, with the possibility of being expanded. The use of compounded polypropylene is a possibility that causes three commercially undesired effects: increased costs by the polypropylene compounding phase, loss of brightness as the content of the compounds reduces polypropylene brightness and increased density. These effects combined adds up costs and leads to loss of properties/quality of the final article.

U.S. Pat. No. 5,310,584 discloses the preparation of polypropylene sheets having a significant amount of beta-spherulites. The improvement obtained with these beta-spherulites is reduction in thermoforming temperature of the sheet. The additive claimed in said document is gamma-quinacridone, which provides a reddish color to polypropylene. In this case, there is also the limitation that large articles cannot be thermoformed since polypropylene structure is still limited by its sag resistance. In this case, sag resistance will be the same, but the process will commence earlier due to the lower melting temperature of this phase.

Document U.S. Pat. No. 6,096,831 also relates to polypropylene having better thermoforming properties, but through HDPE blends. The document suggests criteria for choosing the compositions and the final characteristics of the product. However, it is not as simple as the present invention, since it requires a mixing step which a adds costs to the end product, and it also requires mineral fillers which increase density of the product. The product disclosed herein does not require mixing to polypropylene, thereby maintaining the cost of the solution as well as the low density of polypropylene.

Documents US 2005/0070673 and US 2007/0278717 disclose an improvement in thermoformability of polypropylene for large articles by forming blends via reactive extrusion of polypropylene with ethylene polymer or other polymers, thereby resulting in coupling between them based on azido sulphone agents and providing the blends with thermoforming characteristics. According to the solution proposed in the present invention, there is no addition of ethylene polymers or the need for a coupling reaction between components that are neat polypropylene. It demonstrates simplicity in the composition and in the number of process steps.

Document U.S. Pat. No. 4,567,089 discloses the use of polypropylene in thermoforming processes by co-extruding polypropylenes of different viscosities and characteristics, wherein one layer will provide the system with thermoformability and the other layer with optical features. In the present invention it is made by using a single layer and the polypropylene flowability is greater than that of the layer that confers thermoformability. Finishing and brightness are excellent even with only one layer.

Document US 2005/0159564 describes the production of polypropylenes more suited to thermoforming by polymerization with compositions having very low melt flow rates (MFR) (high molar masses) by using reactors in series. Extreme bimodal products such as that disclosed in document US 2005/0159564 have high melt strength, high sag, but low deformability, which causes the use thereof in thermoforming detailed and deep articles not viable.

Documents WO 2007/138065 A2 and WO 2011/003711 A2 describe an invention where the internal portion of refrigerators comprises HIPS layers and is co-extruded with layers of HIPS and polyethylene blends to improve resistance to chemical attack from PU (polyurethane, responsible for thermal insulation) and from cleaning and food products contacting the internal portion of refrigerators. The invention makes the process more complex and requires one to be more careful when preparing the sheets to ensure thickness homogeneity as well as to guarantee the composition of the preparation phase of HIPS and polyethylene blends and fillers addition. Another fact is that even HDPE blends will not exhibit the same resistance to solvents as neat polypropylene, since it has the HIPS phase in its composition. The simplicity of the solution of the present invention as well as the elimination of mixing steps are important improvements provided by the invention.

Document U.S. Pat. No. 7,585,911 B2 describes the preparation of a refrigerator inner liner with bimodal HDPE compounds having 20 to 60% mineral filler. The compounding step adds cost to the solution, provides a significant increase in density of the solution and for referring to HDPE and a compound, optical properties can be inferior.

U.S. Pat. No. 5,639,818 also relates to polypropylene blends with polyethylenes by reactive extrusion to improve thermoformability of the polypropylene product. The process is based on the addition of unsaturated monomers or LDPE to the sample with addition of usual peroxides for polypropylene degradation. This product is a reactive extrusion where the polypropylene matrix is impaired to the detriment of binding of unsaturated monomers (e.g., acrylates, silane, dienes, and the like) between the polypropylene and polyethylene phases. The present invention also changes characteristics of the matrix and does not require other components to be added, such as acrylates, silanes, dienes, and the like, the response being compatible only with the polypropylene matrix, thereby evidencing the difference of the invention.

DESCRIPTION OF THE INVENTION

The present invention is directed to a polypropylene modified to be better suited to the process of thermoforming large, deep, complex and/or thick articles.

More specifically, the present invention relates to the modification of polypropylene by inserting long-chain branches onto the polypropylene matrix phase, said "long-chain branches" being branches containing more than 1,000 carbon atoms.

The structural change suggested in the present invention modifies the behavior of molten polypropylene and provides the polypropylene with the possibility of being applied to thermoforming of large articles having deep and complex details, by increasing stability of the molten plate that supports its own weight for a longer period of time because of the change in elongation rheological properties of the polypropylene, also providing greater deformability without an abrupt reduction in thickness (a phenomenon known as neck-in).

Suitable modification of polypropylene results in polypropylenes having larger thermoforming windows and superior deformability, with a significant change in behavior, which are prerequisites for heavy, thick, detailed articles.

In this case, the polypropylene matrix may contain comonomers as modifiers of the polypropylene melting temperature, thus providing an increase in the thermoforming processing window for lower temperatures and rendering the polypropylene more competitive in terms of power consumption of the process and cycling speed.

The polypropylene product thus generated has greater chemical resistance than other currently used polymers, providing significant gain of application. In addition to providing polypropylenes more competitive for not requiring a mixing step, the use of neat polypropylene with no addition of fillers or other polymers also provides products with lower density due to the absence of mineral fillers. In the case of blends, control of the mixing process, which is a critical factor for the properties to be achieved, is suppressed. Another positive feature of the product of the present invention over other products is the possibility of obtaining bright articles in monolayered structures, thus simplifying investments, operation costs and the operability of the step of producing sheets by extrusion. The presence of branches provides gains in processability of the extrusion step over linear polypropylene products having the same MFR or the use of products having higher MFR with the same performance.

The subject invention also concerns large, deep, complex and/or thick articles which are prepared by thermoforming said modified polypropylene.

Furthermore, the present invention relates to the process for thermoforming said modified polypropylene into large, deep, complex and/or thick articles.

The present invention also relates to the use of the modified polypropylene to prepare large, deep, complex and/or thick articles.

BRIEF DESCRIPTION OF DRAWING

FIG. 4—Sag comparison of polypropylenes having different molar mass distributions FIG. 5—Effect of a beta-nucleating agent on sag resistance of polypropylenes FIG. 6—Modification in homopolymers—change in the behavior of branched polypropylenes FIG. 7—Sag behavior of copolymers FIG. 8—Effect of the rubber content on sag resistance FIG. 9—Change in sag behavior for copolymers having high MFR FIG. 10—Change in the behavior of copolymers having moderate MFR FIG. 11—Comparison with polypropylenes usually employed in the thermoforming of large, deep, complex and/or thick articles.

DETAILED DESCRIPTION OF THE INVENTION

The present invention is directed to a modified polypropylene which can be obtained from renewable sources, said polypropylene being a homopolymer, a random copolymer, or a heterophasic copolymer modified to be better suited to the thermoforming process by inserting long-chain branches onto the polypropylene matrix phase. In context of the present invention, by "long-chain branches" it is meant branches containing more than 1,000 carbon atoms.

Said branches can be introduced onto the polypropylene, for example, by one or more of the following methods:

Reactive extrusion: by the addition of peroxides free radicals are generated which recombine in the polypropylene in the form of backbone branches. Radical generators can be azo peroxide compounds capable of generating these radicals, such as dicetyl peroxide dicarbonate;

Ionizing radiation: electron beam bombardment or gamma radiation generate radicals that recombine in the form of polypropylene branches; and Crosslinking: Crosslinking agents such as silanes are grafted into the polypropylene chains and they are subjected to a controlled crosslinking process thus generating final conditions of a branched structure.

Mixture and variations in and between the aforementioned usual methods for introducing branches into the polypropylene can occur, such as reactive extrusion with crosslinking agents, but as variations of the same process. In addition, the introduction of branches into the polypropylene according to the present invention can be performed by any other method allowing for the introduction of long-chain branches.

Such introduction of long-chain branches results in the presence of 0.3 to 2 long-chain branches per 1,000 carbon atoms, where the matrix can have from 0 to 6% by weight of comonomer and ethene and alpha-olefin comonomers of from 3 to 18 carbon atoms, and where there is a rubber phase, said phase comprises polypropylene and at least one more ethene and/or alpha-olefin comonomer at a ratio of 3 to 70% by weight ethene plus alpha-olefin, the alpha-olefin comonomers having from 3 to 18 carbons.

In another embodiment, said matrix can have from 0.4 to 3% by weight comonomer, preferably, from 0.6 to 1.8% by weight comonomer.

In the polypropylene that is a modified heterophasic copolymer the rubber phase has a random polypropylene matrix.

Aminosilanes, silanes, acrylates, methacrylates, alpha-beta unsaturated acids and the like can be introduced as comonomers into the polypropylene used in the present invention.

Further, the present invention is directed to large, deep, complex and/or thick articles prepared from thermoforming of the modified polypropylene of the present invention, a large article being understood as that having a formation area greater than 400 cm$^2$, a deep article being the one having a linear thermoforming ratio greater than 1.5 or a thermoformed area ratio greater than 2 or a H:D thermoforming ratio greater than 0.3, a complex article being the one having lots of deep details and angles, and the thick article being the one obtained using sheets having a thickness greater than 0.8 mm.

Preferably, articles resulting from the thermoforming in accordance with the present invention exhibit a thermoforming area ratio greater than 2, sheet thicknesses greater than 0.8 mm and final articles greater than 400 cm$^2$.

More preferably, said articles exhibit a H:D thermoforming ratio greater than 0.3, with sheet thicknesses greater than 0.9 mm and final articles greater than 1,600 cm$^2$.

Preferably, the following components can be added to the polypropylene of the present invention: flow adjuvants, lubricants, antistatic agents, clarifying agents, nucleating agents, beta-nucleating agents, slippage agents, antioxidants, antacids, HALS, IR absorbers, fillers such as silica, titanium dioxide, silicon dioxide, organic and/or inorganic dyes and the like.

The polypropylene of the present invention can be a homopolymer having MFR greater than 3.5 g/10 min, a melt strength of between 15 cN and 35 cN at 190° C. and an extensibility greater than 11 cm/s.

Furthermore, the polypropylene of the present invention can be a random copolymer having MFR greater than 2.0 g/10 min, a melt strength greater than 15 cN at 190° C. and an extensibility greater than 11 cm/s.

In addition, the polypropylene of the present invention can be a heterophasic copolymer having MFR greater than 1.5 g/10 min, a melt strength of between 12 cN e 40 cN at 190° C., an extensibility greater than 11 cm/s and impact strength greater than 100 J/m at room temperature.

Polypropylenes of the present invention are thermoformed into large, deep, complex and/or thick articles for application to automotive vehicles such as in bumpers, instrument panels, seats, backrests, glove compartment doors, center console, door protectors, door stanchions, fluid reservoir, tire protectors, fenders, and the like.

Furthermore, the polypropylenes of the present invention are thermoformed into large, deep, complex and/or thick articles to be used in refrigerators and freezers as counterdoors, cases, fluid reservoirs, evaporators and the like.

An additional use is in articles for other household appliances such as air conditioners, dishwashers, laundry machines, TVs, vacuum cleaners and the like.

Moreover, polypropylenes of the present invention are thermoformed into large, deep, complex and/or thick articles to be used in furniture, tractors, garden tractors, trucks, buses and the like. Also, they can be used in electronic equipment, such as TVs, DVDs, sound systems, home-theaters, notebooks, netbooks, desktops, and the like.

In addition, the present invention relates to the process of thermoforming said modified polypropylene into large, deep, complex and/or thick articles, comprising the steps of:

molding a sheet of the modified polypropylene of the present invention;

applying atmospheric vacuum to the molding, with or without the aid of specific tools or techniques/methods; and obtaining large, deep, complex and/or thick articles.

The present invention also relates to the use of modified polypropylene to prepare large, deep, complex and/or thick articles.

EXAMPLES

Polypropylene Preparation

Polypropylenes were prepared in a pilot plant and compared with industrial products listed in tables 1 and 2. "H" stands for polypropylene homopolymers and "CP" stands for copolymers. The following number relates to the MFR of the samples.

Polypropylene Modification

The modification was carried out in a laboratory extruder ZSK-26 by adding peroxide having high polypropylene reactivity and extruded at a suitable temperature and inertization profile at temperatures of between 160 and 250° C. Both the peroxide and the polypropylene were pre-mixed in an intensive mixer and gravimetrically dosed with $N_2$ inertization. The peroxide level used was designated as MOD I and MOD II, where the latter was at a higher concentration than the former, the concentrations being in a range of from 0.01 to 5%.

Measurement Methodology

Figure 1:
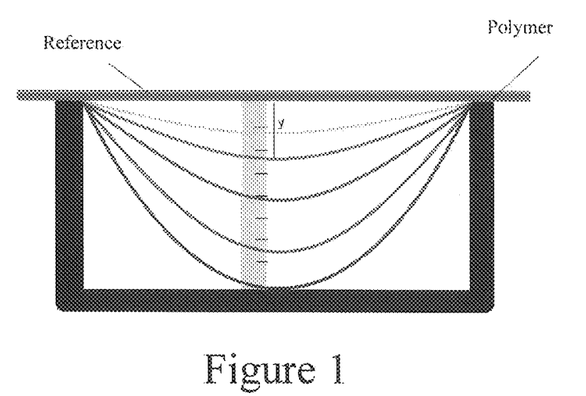
FIG. 1—Scheme of sag analysis of polypropylene sheets

Rheological analysis was carried out at 200° C. in a controlled stress rotational rheometer using a plate/plate geometry in wafers previously pressed for 5 minutes at 200° C. and assessed in a MCR-501 equipment from Antoon Paar at 200° C. with a stress within the linear viscoelasticity regime. Sag tests (resistance to its own weight) were carried out according to the method where a 1.3-mm thick, 100-cm wide, 160-mm long plate pressed at 200° C. for 5 minutes and cooled down to 20° C./min is placed onto a specific, bottom-graduated support at a temperature of 190° C. The oven used was that from Instron tensile equipments with electronic control and convection heating. The time needed for the plate to reach deformations of 10 to 100 mm is collected and results are plotted, as shown in FIG. 1. The measured time for the surface of the sheet to reach a temperature of 190° C. was 120 s. Initial phases of the curve are related to melting of the polypropylene and the following regions represent the sag resistance of the polypropylene. The less the polypropylene weakens with time, the better its thermoformability, that is, the less the slope of the curve, the better the characteristic. Melt strength tests were performed using a Göttfert, Rheotens 71.97 rheometer coupled to the Haake extruder at a temperature of 190° C., a 2-mm thick capillary and L/D of 20. Acceleration applied to the drawing pulley was 60 mm/s$^2$ and the distance from the capillary outlet was 60 mm.

Eta(0) values were calculated using the Carreau equation, the value for the deformation rate being zero, as shown in the equation below.

$$\eta = \eta_0 * [1 + (\lambda_e \cdot \dot{\gamma})^a]^{n-1/a}$$

wherein:
η is the viscosity of the polypropylene
$\eta_0$ is the viscosity of the polypropylene at zero shear rate
$\lambda_e$, a and n are setting parameters
$\dot{\gamma}$ is the shear rate applied to the material

EXAMPLES

In examples 1 to 4, polypropylene homopolymers having different molar masses and molar mass distribution were used. Description of non-modified polypropylenes is presented in Table 1 and their important thermoforming properties in Table 2.

TABLE 1

Characteristics of the polypropylene homopolymer used

| | Catalyst | Solubles (%) | Flexural modulus (MPa) | Impact at 23° C. (J/m) | Source |
|---|---|---|---|---|---|
| H 3 | Ziegler-Natta | 4 | 1400 | 35 | Industrial product (H 503) |
| H 10 | Ziegler-Natta | 4 | 1200 | 25 | Industrial product (H 301) |
| H 1 | Ziegler-Natta | 4 | 1400 | 43 | Industrial product (H 606) |
| H 3-2 | Phthalate | <2 | 2300 | 21 | Industrial product (H 501) |
| H 3-2 beta | Phthalate | <2 | 2000 | 35 | Industrial product (H 501) |
| H 5 | Not defined | 2.3 | 1800 | 33 | Product from pilot plant |

TABLE 2

Properties of important homopolymers for thermoforming

| | MFR (g/10 min) | MWD | Eta (0) (Pa · s) | MS (cN) | Ext (cm/s) | Note |
|---|---|---|---|---|---|---|
| H 3 | 3.5 | 4 | 10500 | 6.5 | 10.8 | |
| H 10 | 10 | 4 | 4218 | 3.0 | 10.1 | |
| H 1 | 1.5 | 4 | 22210 | 10.5 | 12.0 | |
| H 3-2 | 3.3 | 5.5 | 15350 | 9.5 | 8.6 | |
| H 3-2 beta | 3.3 | 5.5 | 15350 | 9.4 | 8.7 | Beta-nucleated |
| H 5 | 5 | 7 | 17840 | 18.7 | 7.5 | |
| H 3 mod | 1.5 | 6 | 61280 | 32 | 11.8 | MOD II modified |

MFR is the melt flow rate of the polypropylene
MWD is the rheological molecular weight distribution index.
Eta(0) is the zero shear viscosity calculated using the Carreau model
MS is the melt strength in cN
Ext is the polypropylene extensibility at the maximum MS.

Upon observing the effect of MFR of the polypropylene molecular weight on sag resistance, it is noted that higher molecular weights tend to reduce the terminal flow rate and then materials start to have utility in thermoforming processes.

Example 1

Figure 2:
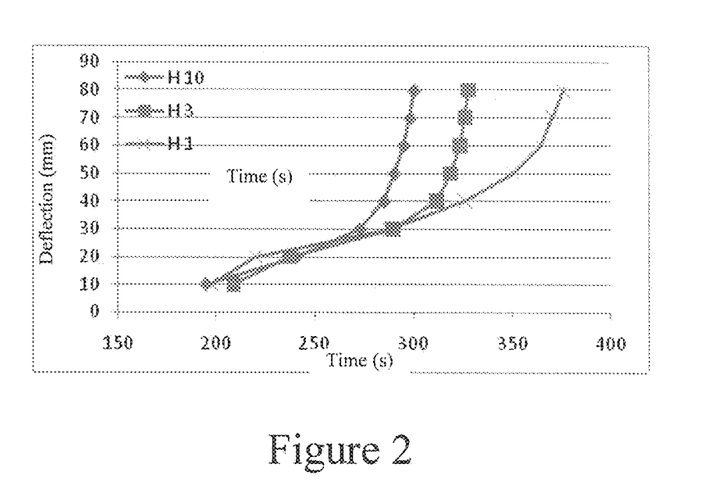
FIG. 2—Sag behavior of several homopolymers

FIG. 2 shows that polypropylenes tend to exhibit catastrophic deformation with the reduction in the molecular weight. In this case, the material will tend to provide little time to be heated and transferred to the thermoforming die, thereby not being industrially viable. As a skilled person knows, polypropylenes are applied in small articles in thermoforming and, where used, they are products having MFR of less than 5 g/10 min. In this case, a direct correlation between melt strength, Eta(0) and molar mass of polypropylenes, including the MFR of the polypropylene can be found.

Figure 3:
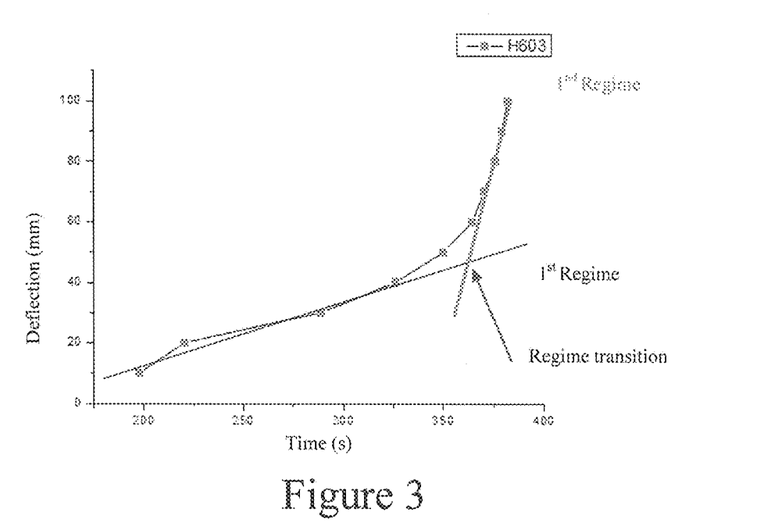
FIG. 3—Description of the stage of deformation in sag analysis

FIG. 3 shows that the limitation is given by the mechanism by which the polypropylene is deformed, where it has two distinct behaviors: 1) initial deformation regime and 2) catastrophic deformation regime.

As is a characteristic of polypropylene, a suitable molar mass is required for thermoforming to take place, since a minimum time is needed for heating to occur without collapsing the sheet. Regime transition will be more accentuated with higher thicknesses, higher deformation stresses and lower molar masses of the polypropylene.

Example 2

Figure 4:
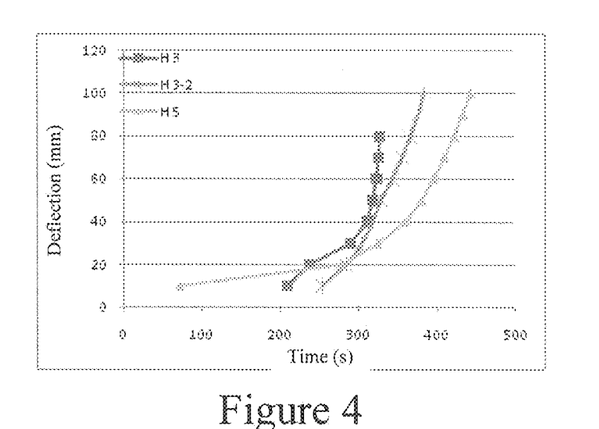

As outlined in FIG. 4, another effect observed was the polydispersity (DPM) of polypropylenes. The higher the DPM, the lower the slope of the terminal region of linear polypropylenes.

With higher DPMs, polypropylenes have a larger number of molecules of higher weight having as a consequence larger number of entanglements. These entanglements tend to hold the structure, not enabling catastrophic deformation to occur in specific cases. However, based on data from table 1 it is possible to note that the same resistance generated renders linear polypropylenes to be of lower deformability, which is an obstacle to the use thereof in large, deep, complex and/or thick articles. Even with higher MFRs, H 5 polypropylene exhibits lower sagging rate than H3-2 and H3 because of the larger high weight fraction. The obstacle of this route is that polypropylenes with linear molecules of high molecular weight do not tend to have high extensibility, which makes thermoforming difficult, or for requiring a very high vacuum pressure or even preventing the formation of deep/detailed articles due to the absence of sufficient extensibility. It is demonstrated herein that polypropylene has characteristics that cause an improvement in its behavior, being an important variable in the modification process. Polypropylene features prior to modification are essential for one to achieve better performance and the modification on any polypropylene does not result in products suitable for thermoforming large, deep, complex and/or thick articles.

In these cases, an excellent correlation between melt strength, Eta(0) and sag resistance can be observed, but the relationship with MFR becomes wrong.

Example 3

Figure 5:
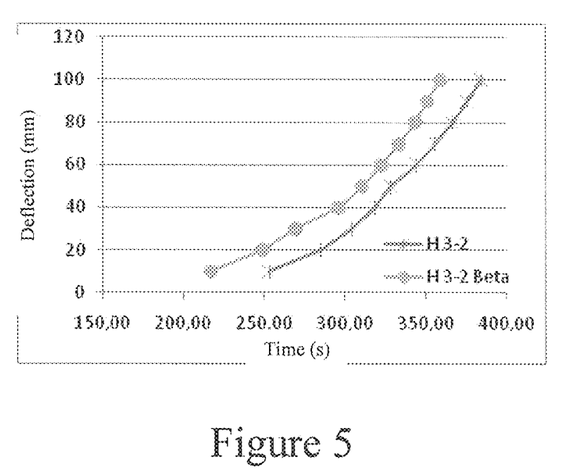

By adding beta-nucleating agents to polypropylenes, one observes that a reduction in the melting temperature of the product by up to 10° C. makes it possible to process the material at lower temperatures, but sag resistance of the polypropylene is not changed, only presenting the same phenomenon shifted in time for lower values. With that, the only gain of beta nucleation is the reduction in the processing window by some degrees, but the application cannot be expanded to large, deep, complex and/or thick articles since the rheological properties of the product are not changed. There is no alteration of the polypropylene behavior in molten state, as identified in FIG. 5.

Example 4

Figure 6:
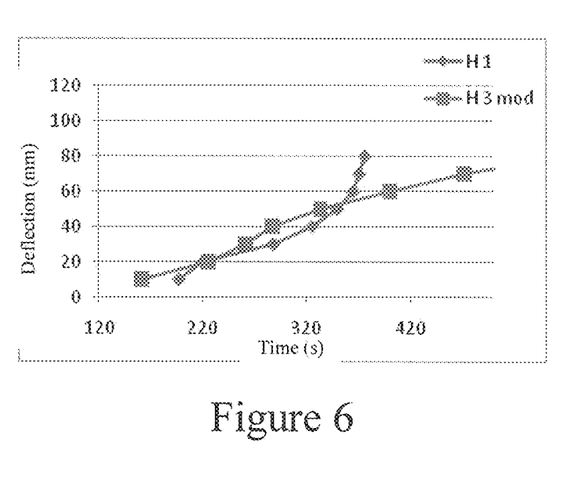

In FIG. 6, upon comparing polypropylenes having the same MFR, but one of them being linear and the other one being modified via reactive extrusion, one notes a striking modification of properties.

The effect of the modification on the polypropylene renders the same suitable for thermoforming with a very slow deformation and without exhibiting a catastrophic regime. This kind of behavior allows for a broad control of the process. The effect of a small number of long-chain branches renders the polypropylene more suited to thermoforming, providing a time sufficient for a homogeneous heating process to occur, due to the high heat capacity of the polypropylene relative to other polymers such as ABS and HIPS, in addition to the knwon lower infra-red absorptive capacity and low thermal conductivity.

For examples 5-10 different polypropylene copolymers were used with different rubber contents and MFRs. Viscosity of rubbers is roughly the same as well as the composition thereof.

Products are listed in Tables 3 and 4.

TABLE 3

Characteristics of the polypropylene copolymer

|  | Catalyst | Flexural modulus (MPa) | Impact at 23° C. (J/m) | Source |
| --- | --- | --- | --- | --- |
| CP 4 | Ziegler-Natta | 990 | NB | Product from pilot plant |
| CP 6-1 | Phthalate | 1600 | 70 | Industrial product |
| CP 6-2 | Phthalate | 1100 | NB | Industrial product |
| CP 6-3 | Ziegler-Natta | 850 | NB | Industrial product |
| CP 30 | Ziegler-Natta | 900 | NB | Industrial product |
| CP 0.8 | Ziegler-Natta | 900 | NB | Industrial product |

NB considered by standard to be no-break

TABLE 4

Important properties for thermoforming

|  | MFR | Eta(0) | MS | Ext | Rubber content |
| --- | --- | --- | --- | --- | --- |
| CP 4 | 4 | 10560 | 3 | 10 | Medium-high |
| CP 6-1 | 6 | 6308 | 4.5 | 11.9 | Low |
| CP 6-2 | 6 | 4510 | 4.1 | 10.8 | Medium |
| CP 6-3 | 6 | 5966 | 2.6 | 9.7 | High |
| CP 30 | 30 | 1077 | 1 | 12.3 | High |
| CP 0.8 | 0.8 | 44460 | 46.9 | 10.3 | Medium |

Example 5—Copolymers

Figure 7:
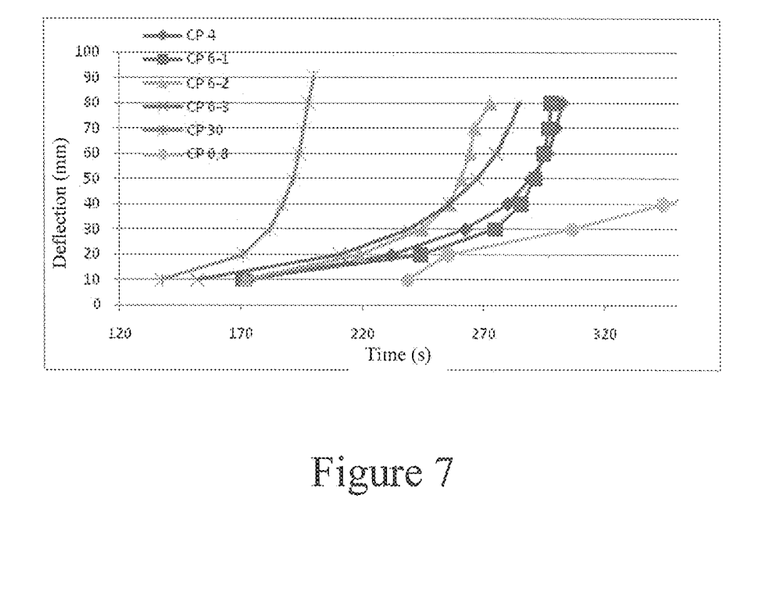

FIG. 7 shows homopolymers as well as two deformation regions. With the presence of a rubber phase, terminal phases tend to be smoothed but still exhibit catastrophic deformation. In the case of very low MFRs, a thermoforming-friendly product can be obtained, but it has high viscosity restrictions.

Example 6—Rubber Content

Figure 8:
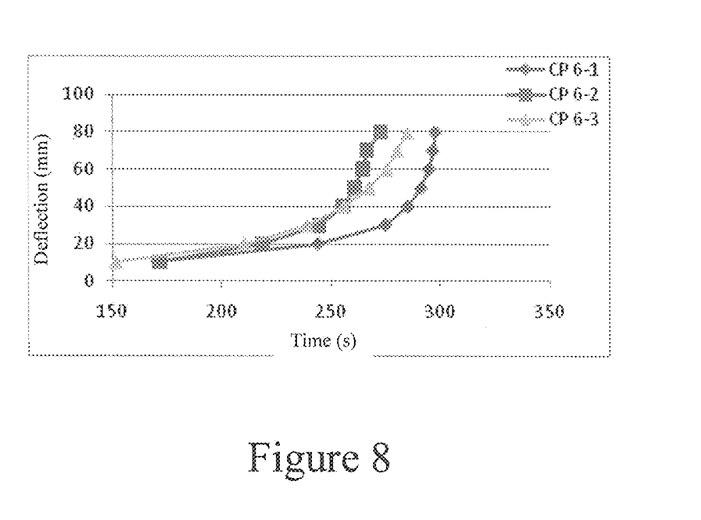

As seen in FIG. 8, there is a dependence upon the rubber content, but it is evident that CP 6-3 polypropylene seems to be less catastrophic while CP 6-1 polypropylene deforms more slowly. As it refers to a biphasic system, upon assessing only the MFR or final viscosity of copolymers, one notes the dependence of the rubber phase to catastrophic deformation and the greater operating time provided by a polypropylene having less rubber and consequent higher matrix viscosity so as to have the same MFR. Thus, it is possible to have polypropylene suited for the process only when there is a matrix of high viscosity and at least medium rubber contents. Behavior of CP 0.8 polypropylene and its possible application in thermoforming are thus explained.

As one can see, e.g., in examples 2 and 6, polypropylene characteristics are very important to the process, wherein modification on any heterophasic copolymer polypropylene does not mean to make it better for thermoforming, which is dependent upon all the characteristics of the phases. One can note that only the presence of rubber or the content thereof does not transform polypropylene into a product more suited for thermoforming.

Example 7—Modification on CP of High MFR

Figure 9:
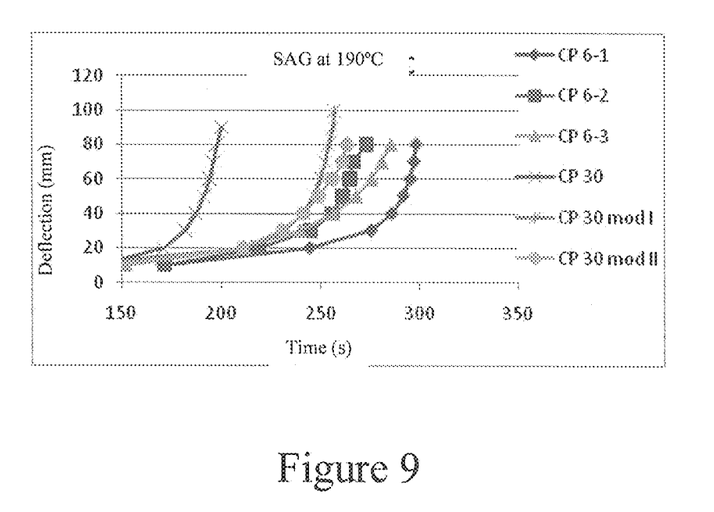

The increase in MFR of the matrix by the modification improves the product response to sag to the point of having greater sag resistance than products of much lower MFRs, as seen in FIG. 9 and that the product of modification degree II with MFR of 9 g/10 min behaves similarly to products having MFR of 6. This significant change is due to the fact that polypropylene matrix is changed to contain long-chain branches and to support the elongational deformation created by the weight of the plates. It is evident that the mere evolution of a linear polypropylene does not mean that it is apt for thermoforming large, thick, deep and/or complex articles.

TABLE 5

Table of rheological values of the modification of polypropylene copolymers having high MFR, according to FIG. 9.

|  | MFR | Eta(0) | MS | Ext | Modification |
|---|---|---|---|---|---|
| CP 30 mod I | 18 | 5345 | 1.7 | 11.5 | MOD I |
| CP 30 mod II | 9.2 | 23370 | 4.3 | 14.5 | MOD II |
| CP 30 | 30 | 1077 | 1 | 12.3 | — |

Example 8—Modification on Intermediate MFRs

By modifying higher MFR polypropylene the behavior becomes entirely different, causing the polypropylene to be much more thermoforming-friendly.

Figure 10:
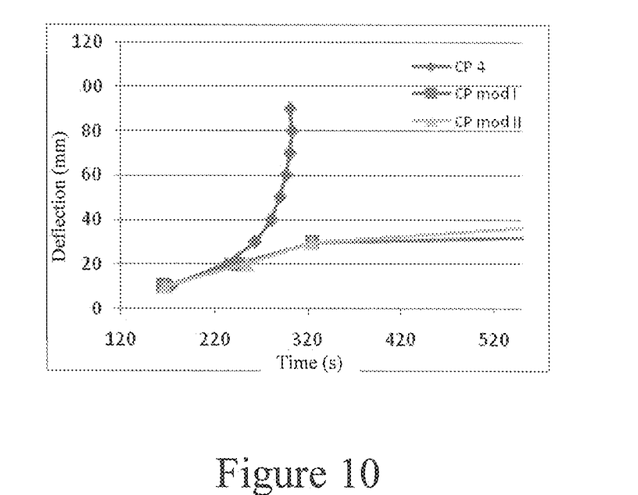

In FIG. 10, catastrophic regimens are no longer observed in polypropylenes, even with a high analysis time (15 min). It can be concluded that the modification renders the polypropylene "friendly", even with MFR characteristics much higher than that of polypropylenes that could be initially used, as is the example of CP 0.8.

TABLE 6

Table of rheological values of the modification of polypropylene copolymers having intermediate MFR.

|  | MFR | Eta(0) | MS | Ext. | Modification |
|---|---|---|---|---|---|
| CP 4 | 4 | 10560 | 4.7 | 9.3 | — |
| CP 4 Mod I | 2.36 | 375000 | 7.3 | 11.8 | MOD I |
| CP 4 Mod II | 1.85 | 506000 | 13.4 | 11.8 | MOD II |

The modifying degree brings the products closer to intended behavior, where the material has enough strength to support its own weight for long periods of time for temperature homogenization and higher thicknesses.

Example 9—Comparison with Polypropylenes Usually Employed in Thermoforming

Figure 11:
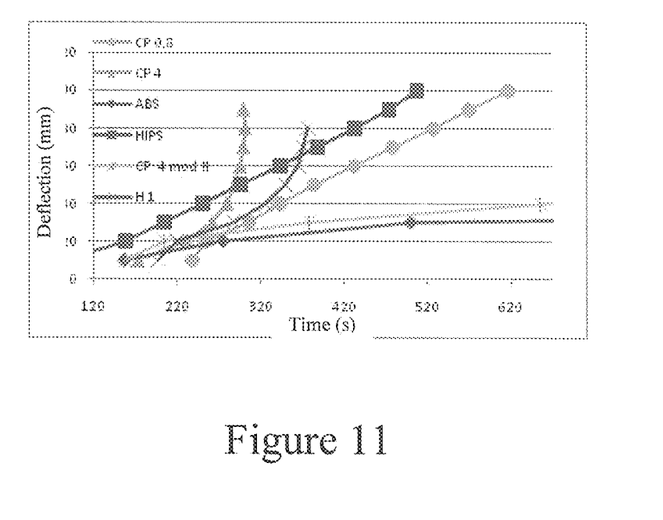

FIG. 11 shows sag resistance features of polypropylenes usually employed in thermoforming with polypropylenes modified herein for thermoforming applications.

Table 7 depicts details of these surrogate polypropylenes relative to the comparison:

TABLE 7

Comparison of properties with materials usually employed in thermoforming

|  | Eta(0) (Pa · s) | MS (cN) | Ext (cm/s) |
|---|---|---|---|
| HIPS | 20670 | 9 | 14.2 |
| ABS | 206400 | 31.9 | 8.7 |
| H1 | 22210 | 10.5 | 12.0 |
| CP 0.8 | 44460 | 46.9 | 10.3 |
| CP 4 MOD II | 506000 | 13.4 | 11.8 |
| CP 4 | 10560 | 3 | 10 |

Eta(0) is the zero shear viscosity calculated using the Carreau model
MS is the melt strength in cN
Ext is the polypropylene extensibility and stretching rate at the maximum MS.

Figure 12:
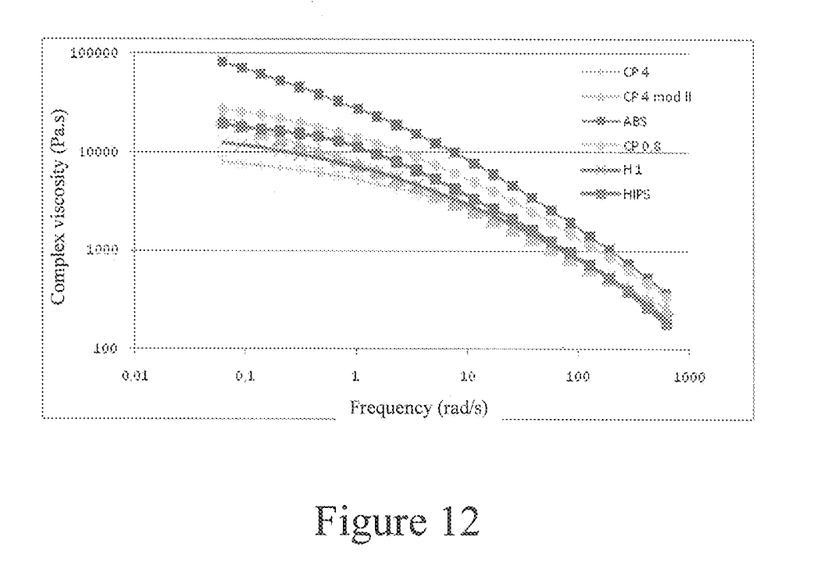
FIG. 12—Viscosity curves of polypropylenes usually employed in the thermoforming of large, deep, complex and/or thick articles.

In addition to being a reliable, non-catastrophic polypropylene, one notes that the compared viscosity of this technology over usually employed products is lower, as can be seen in FIG. 12. With that, in addition to energetic gains, a gain in the production rate is also noted without loss in performance. This is due to the presence of branches on the polypropylene matrix thereby ensuring a gain in performance for materials of lower viscosities.

What is claimed is:

1. A modified heterophasic copolymer polypropylene for the preparation of thermoformed articles, obtained by modification via reactive extrusion of a polypropylene comprising from 0% to 6% of a comonomer in the synthesis thereof, a rubber phase comprising propene and at least one alpha-olefin or ethene comonomer at a ratio of 3 to 70% by weight and having 3 to 18 carbons, wherein the modified heterophasic copolymer polypropylene comprises from 0.3 to 2 long-chain branches per 1,000 carbon atoms, a MFR greater than 1.5 g/10 min, a melt strength of between 12 cN and 40 cN at 190°, an extensibility greater than 11 cms/s and an impact strength higher than 100 J/m at room temperature, characterized in that comonomers selected from the group consisting of aminosilanes, silanes or alpha-beta unsaturated acids can be added in the modification step.

2. The modified heterophasic copolymer polypropylene of claim 1, wherein the polypropylene has from 0.4 to 3% by weight of comonomer in the synthesis thereof.

3. The modified heterophasic copolymer polypropylene of claim 1, wherein the polypropylene has from 0.6 to 1.8% by weight of comonomer in the synthesis thereof.

4. The modified heterophasic copolymer polypropylene of claim 1, wherein the modified heterophasic copolymer polypropylene is supplemented with a flow adjuvant, lubricants, antistatic agents, clarifying agents, nucleating agents, beta-nucleating agents, slippage agents, antioxidants, antacids, HALS, IR absorbers, fillers such as silica, titanium dioxide, silicon dioxide, organic and/or inorganic dyes.

5. The modified heterophasic copolymer polypropylene of claim 1, characterized by being obtained from renewable sources.

6. Large, deep, complex and/or thick articles, characterized in that said articles are prepared by thermoforming the modified heterophasic copolymer polypropylene of claim 1, wherein said articles have a formation area greater than 400 cm$^2$.

7. The articles of claim 6, wherein said articles have a linear thermoforming ratio greater than 1.5, with sheet thicknesses greater than 0.8 mm.

8. The articles of claim 6, wherein said articles have a H:D thermoforming ratio greater than 0.3, with sheet thicknesses greater than 0.9 mm and final articles greater than 1,600 cm$^2$.

9. The articles of claim 6, wherein said articles are for application to automotive vehicles in bumpers, instrument panels, seats, backrests, glove compartment doors, center console, door protectors, door stanchions, fluid reservoirs, tire protectors and fenders.

10. The articles of claim 6, wherein said articles are for application in refrigerators and freezers, as counter-doors, internal cases, fluid reservoirs and evaporators.

11. The articles of claim 6, wherein said articles are for use in other household appliances including air conditioners, dishwashers, laundry machines, TVs and vacuum cleaners.

12. The articles of claim 6, wherein said articles are for application in furniture, tractors, garden tractors, trucks and buses.

13. The articles of claim 6, wherein said articles are for application in electronic equipment, including TVs, DVDs, sound systems, home-theaters, notebooks, netbooks and desktops.

14. A process for thermoforming modified polypropylene, comprising the steps of:
    molding a sheet of modified heterophasic copolymer polypropylene of claim 1;
    applying atmospheric vacuum to the molding, with or without the aid of specific tools or techniques/methods; and
    obtaining large, deep, complex and/or thick articles.

\* \* \* \* \*